US00RE45915E

(19) United States
(12) Reissued Patent
Walter

(10) Patent Number: US RE45,915 E
(45) Date of Reissued Patent: Mar. 8, 2016

(54) SHOPPING CART

(71) Applicant: AMSA, Inc, Boulder, CO (US)

(72) Inventor: Ivor Michel Walter, Boulder, CO (US)

(73) Assignee: AMSA, Inc., Boulder, CO (US)

(21) Appl. No.: 29/518,681

(22) Filed: Feb. 26, 2015

Related U.S. Patent Documents

Reissue of:
(64) Patent No.: Des. 677,033
Issued: Feb. 26, 2013
Appl. No.: 29/422,848
Filed: May 24, 2012

(51) LOC (10) Cl. ..... 12-02
(52) U.S. Cl.
USPC ..... D34/21
(58) Field of Classification Search
USPC ..... D34/12–27; 280/33.991, 33.992, 47.34, 280/79.11, 79.2, 33.997, 33.998, 33.996, 280/33.995, 47.35, 651, 659, 79.3; 297/256.17, 473; 40/395
CPC ..... B62B 3/14; B62B 3/182; B62B 3/1476; B62B 3/1468
See application file for complete search history.

(56) References Cited

U.S. PATENT DOCUMENTS

| | | | | |
|---|---|---|---|---|
| 2,764,419 | A | 9/1956 | Enders | |
| 2,958,537 | A | 11/1960 | Young | |
| 3,039,564 | A | 6/1962 | Shaukis | |
| 3,645,554 | A | 2/1972 | Von Stein et al. | |
| 4,356,651 | A * | 11/1982 | Barlow | 40/308 |
| D348,549 | S | 7/1994 | Trubiano | |
| 5,435,582 | A | 7/1995 | Davidson | 280/33.992 |
| 5,507,507 | A | 4/1996 | Davidson | |
| 5,553,876 | A | 9/1996 | Trubiano | |
| D400,679 | S * | 11/1998 | Kern et al. | D34/27 |
| 5,865,449 | A * | 2/1999 | Castaneda | 280/33.996 |
| 6,126,181 | A | 10/2000 | Ondrasik | |
| 6,193,246 | B1 * | 2/2001 | Ondrasik | 280/33.995 |
| D445,230 | S * | 7/2001 | Deal et al. | D34/21 |

(Continued)

OTHER PUBLICATIONS

Technibilt 5640 Scan of website [http://www.technibilt.com/carts/detail.php?id=28] showing prior art cart manufactured by Techbilt.

(Continued)

*Primary Examiner* — Philip S Hyder
*Assistant Examiner* — Darlington Ly
(74) *Attorney, Agent, or Firm* — Polson Intellectual Property Law, PC; Margaret Polson

(57) CLAIM

The ornamental design for a *shopping* cart, as shown and described.

DESCRIPTION

FIG. 1 is a front perspective view of my new design for a *shopping* cart showing my new design;
FIG. 2 is a side elevation view of the right and left sides, which are mirror images, of FIG. 1.
FIG. 3 is a front side elevation view of FIG. 1.
FIG. 4 is a back side elevation view of FIG. 1.
FIG. 5 is a top plan view of FIG. 1; and,
FIG. 6 is a bottom plan view of FIG. 1.
The broken line showing of the *upper basket,* wheels, back portion of *the* bottom basket, hook, handle and bumpers is included for the purpose of illustrating portions of the *shopping* cart and forms no part of the claimed design.

1 Claim, 5 Drawing Sheets

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| 6,644,674 | B2 | | 11/2003 | Simard | |
| 6,932,363 | B2 | | 8/2005 | D'Angelo | |
| D538,501 | S | | 3/2007 | Walter | |
| D542,997 | S | * | 5/2007 | Coderre | D34/17 |
| D577,172 | S | * | 9/2008 | Coderre | D34/12 |
| D580,619 | S | | 11/2008 | Walter | |
| D583,523 | S | | 12/2008 | Deal et al. | |
| D584,023 | S | * | 12/2008 | Walter | D34/12 |
| D606,723 | S | | 12/2009 | Walter | |
| D607,173 | S | | 12/2009 | Selvig et al. | |
| 7,681,891 | B2 | | 3/2010 | Deal et al. | |
| D633,269 | S | | 2/2011 | Walter | |
| D638,302 | S | | 5/2011 | Walter | |
| D638,602 | S | | 5/2011 | Walter | |
| D639,521 | S | | 6/2011 | Walter | |
| D643,175 | S | | 8/2011 | Peota et al. | |
| D644,393 | S | | 8/2011 | Walter | |
| D644,809 | S | | 9/2011 | Walter | |
| D645,222 | S | | 9/2011 | Walter | |
| D645,631 | S | | 9/2011 | Walter | D34/21 |
| D656,700 | S | | 3/2012 | Walter | |
| D663,091 | S | | 7/2012 | Walter | |
| D665,552 | S | * | 8/2012 | Walter | D34/21 |
| D665,962 | S | * | 8/2012 | Walter | D34/27 |
| D677,033 | S | * | 2/2013 | Walter | D34/21 |
| D680,704 | S | * | 4/2013 | Walter | D34/27 |
| D685,972 | S | | 7/2013 | Walter | |
| 2001/0022436 | A1 | | 9/2001 | Simard | |
| 2003/0151219 | A1 | | 8/2003 | Simard | 280/47.35 |
| 2009/0160145 | A1 | | 6/2009 | Deal et al. | 280/33.992 |
| 2009/0309322 | A1 | | 12/2009 | Selvig et al. | 280/33.996 |
| 2010/0102523 | A1 | | 4/2010 | Deal et al. | |

OTHER PUBLICATIONS

Peggs KNM075GT Scan of website [http://www.thepeggscompany.com/shopping_carts/large view/2_tier.html] showing prior art cart manufactured by Peggs.

Technibilt 5141-D Scan of website [http://www.technibilt.com/carts/detail.php?id=36] showing prior art cart manufactured by techibilt.

Technibilt 5341 Scan of website [http://www.technibilt.com/carts/detail.php?id=30] showing prior art cart manufactured by Techibilt.

U.S. Appl. No. 29/410,149, filed Jan. 4, 2012; Inventor: Ivor Michel Walter.

U.S. Appl. No. 29/410,150, filed Jan. 4, 2012; Inventor: Ivor Michel Walter.

U.S. Appl. No. 29/417,407, filed Apr. 3, 2012; Inventor: Ivor Michel Walter.

* cited by examiner

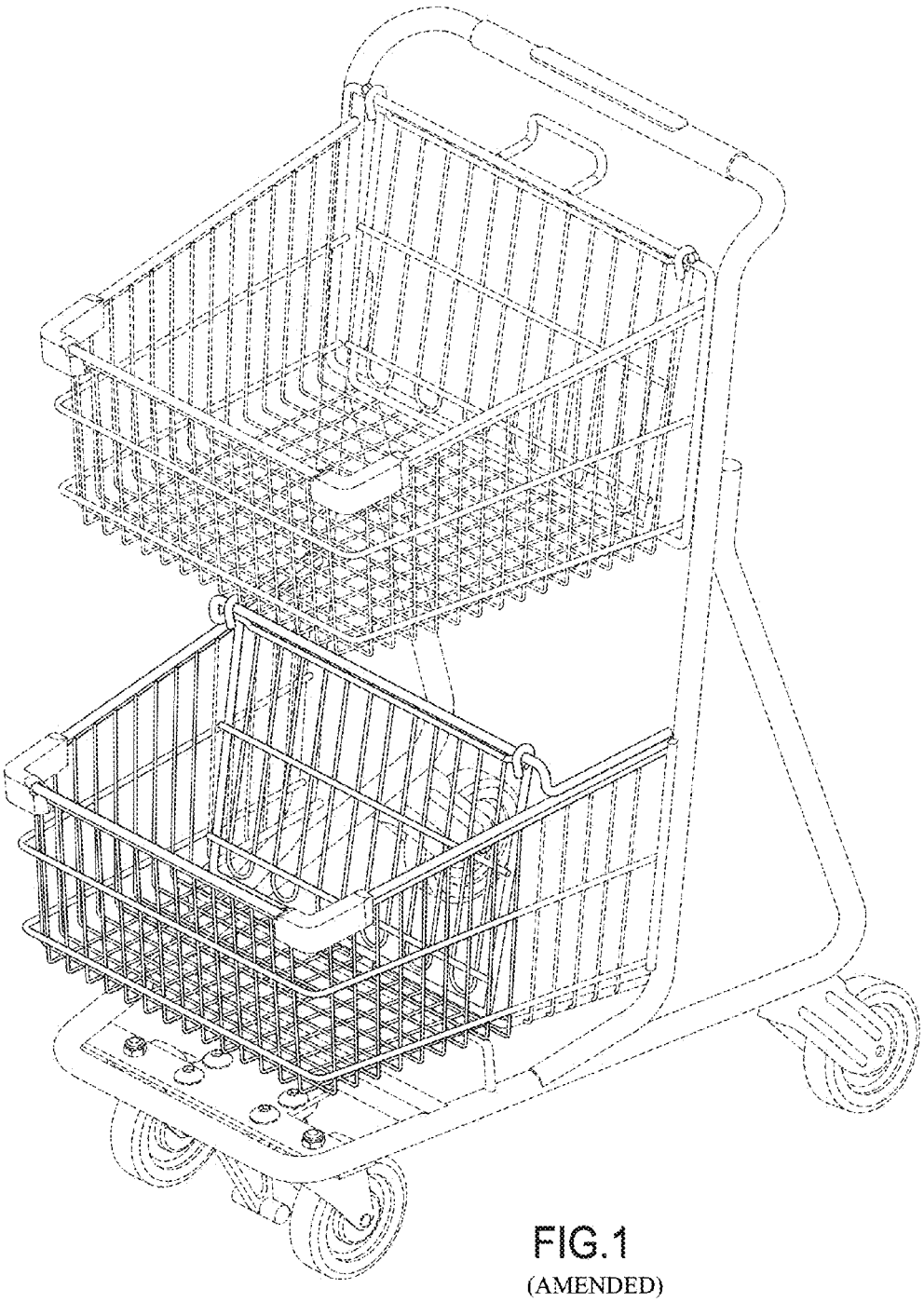
FIG.1
(AMENDED)

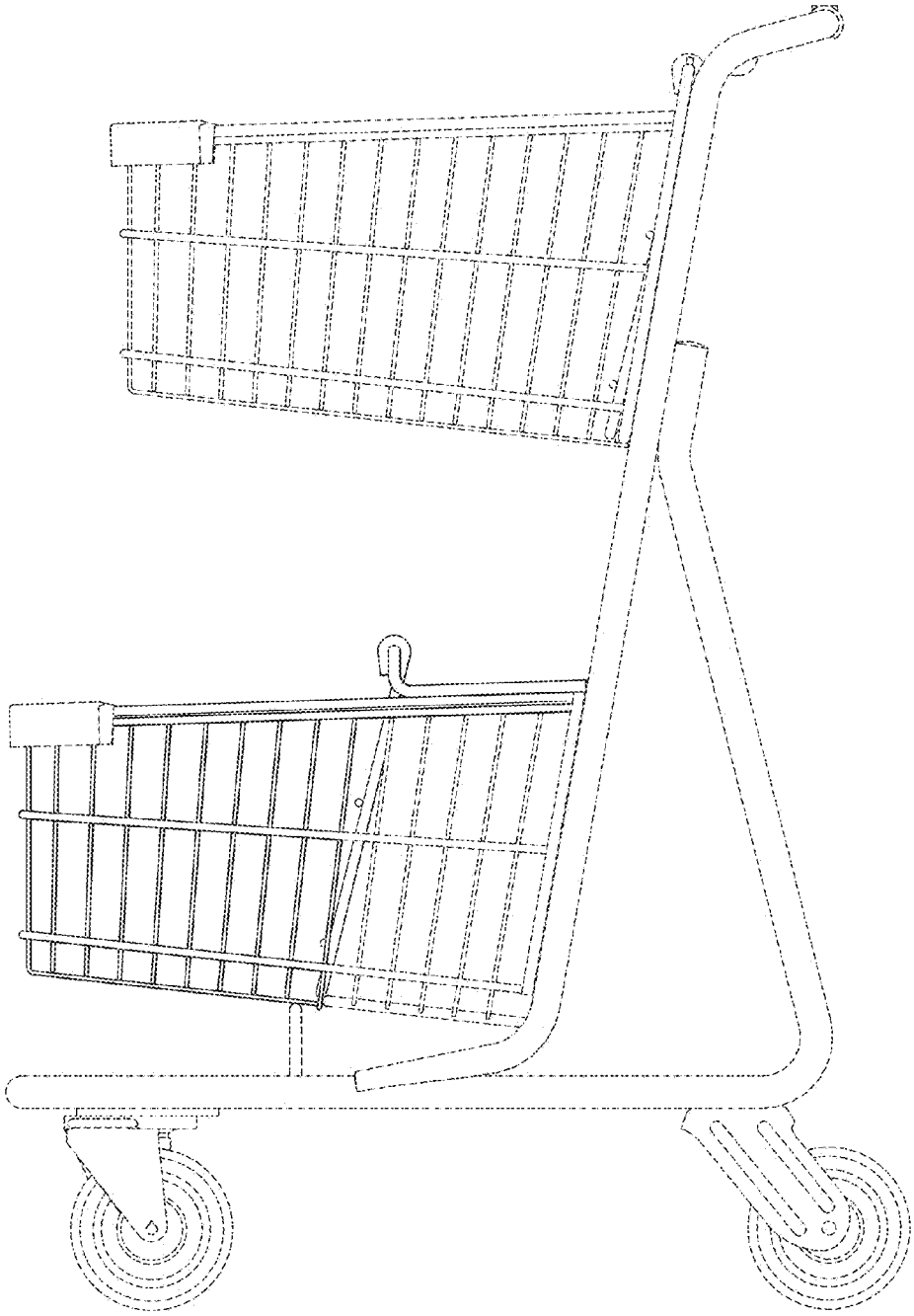
FIG.2
(AMENDED)

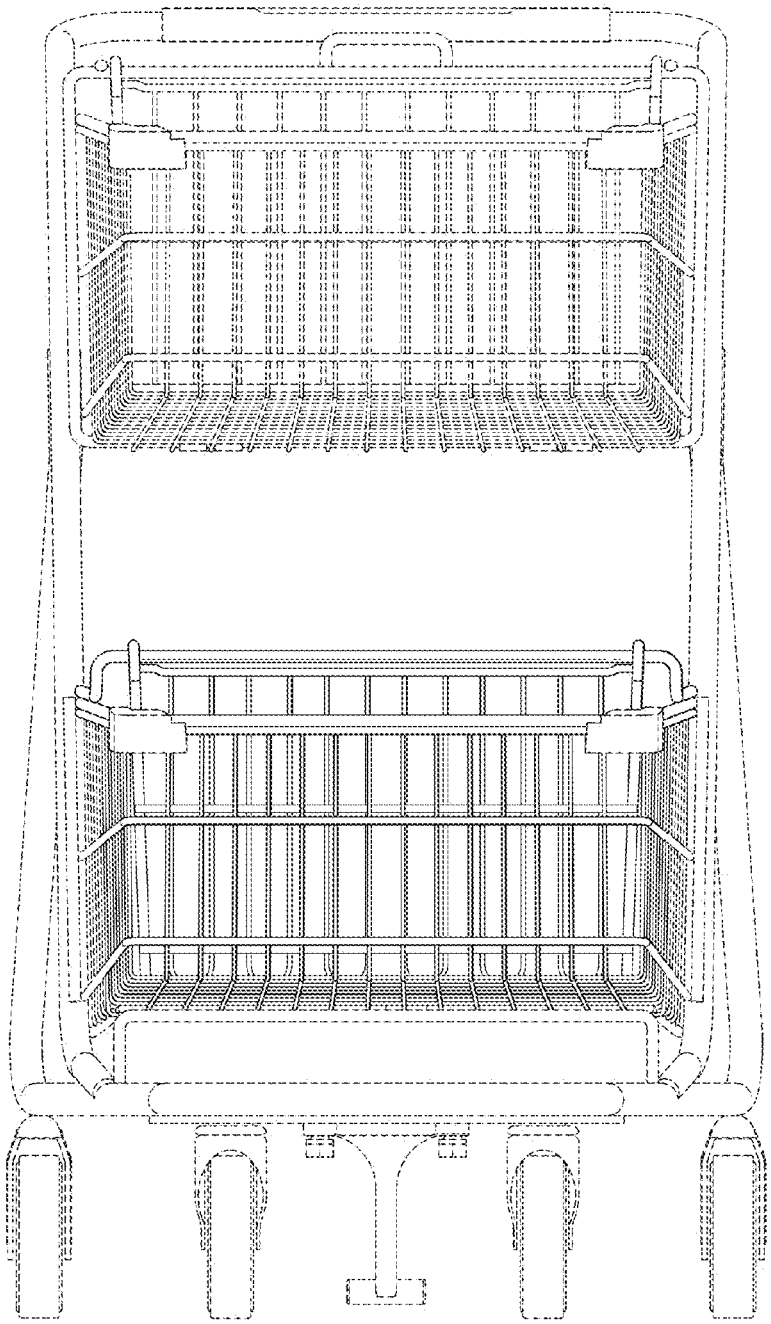
FIG.3
(AMENDED)

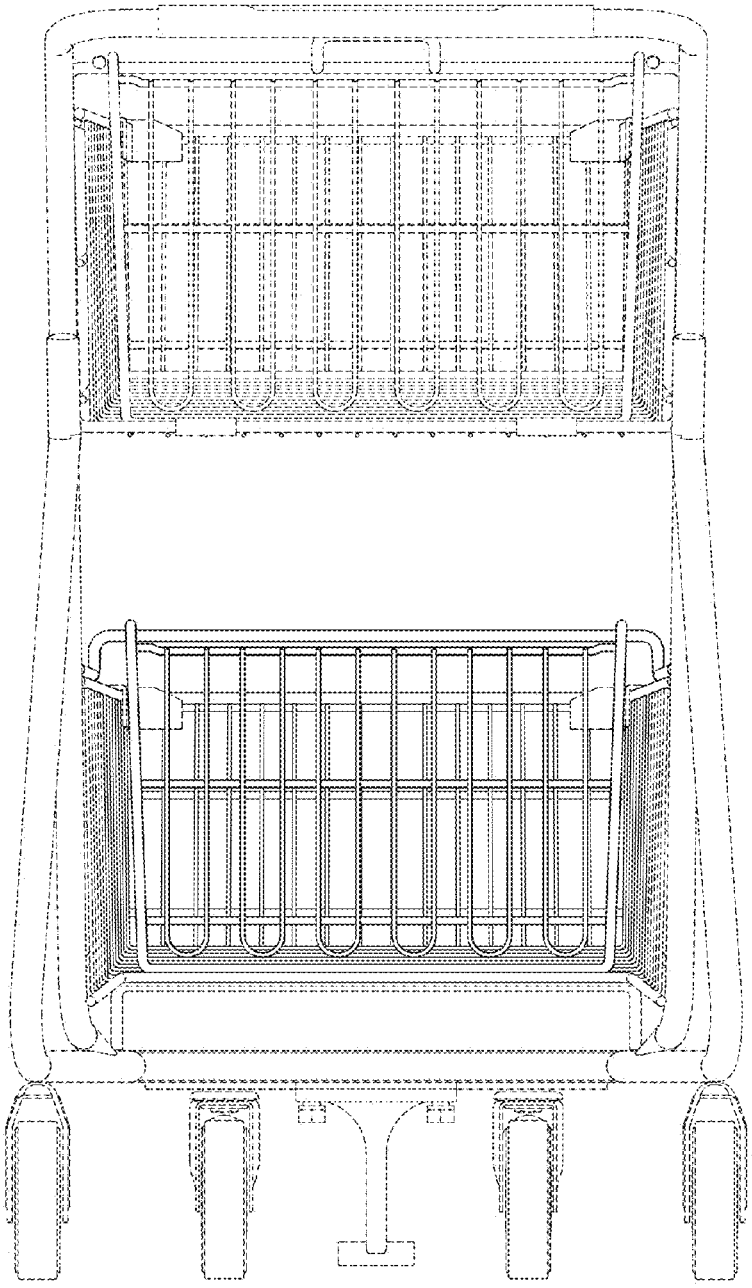
FIG.4
(AMENDED)

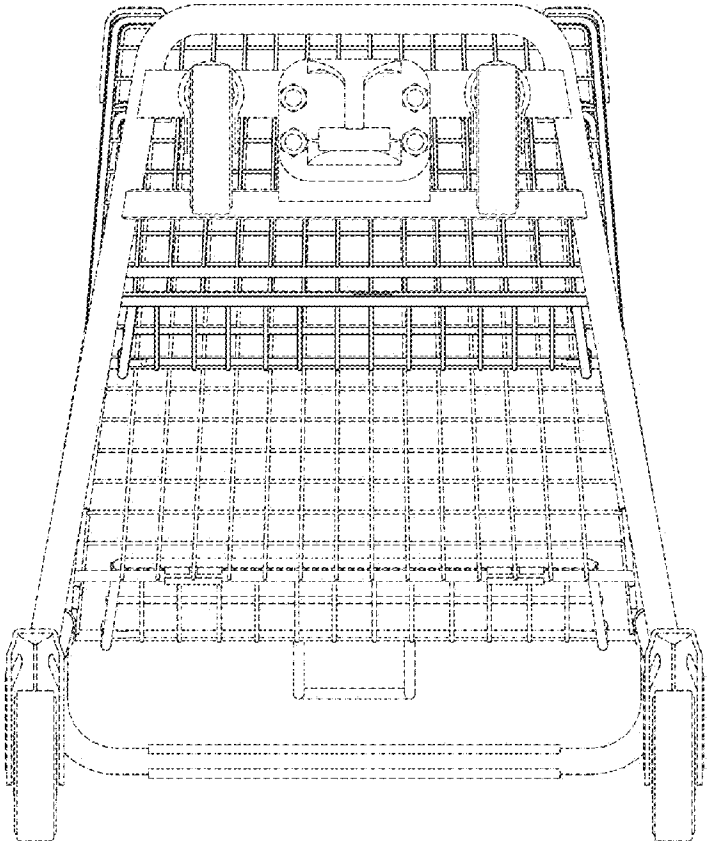
FIG.6
(AMENDED)
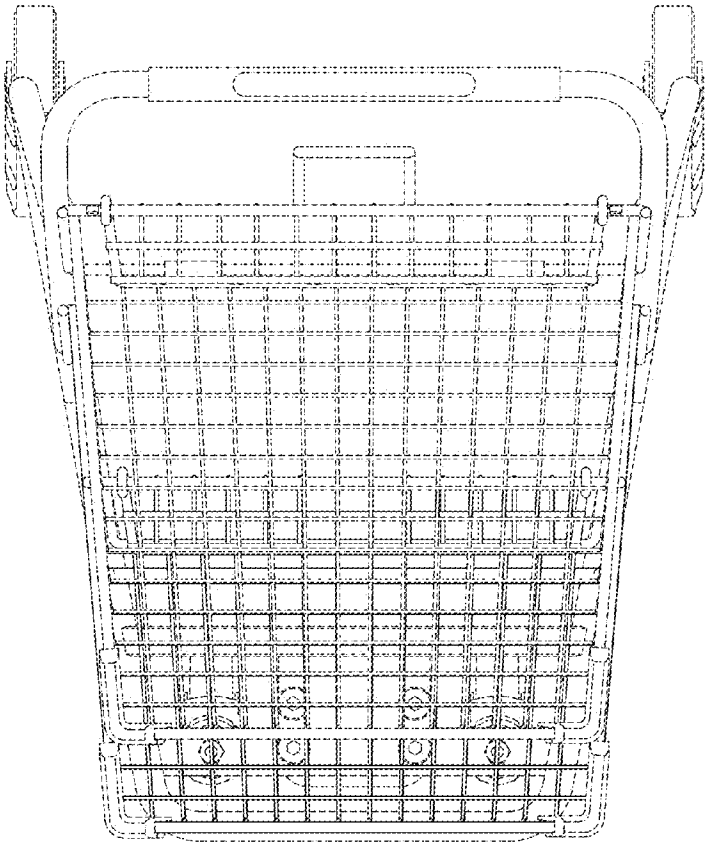
FIG.5
(AMENDED)